United States Patent [19]
Gresham et al.

[11] Patent Number: 5,143,289
[45] Date of Patent: Sep. 1, 1992

[54] APPARATUS AND METHOD FOR AUTOMATICALLY DISPERSING AGGREGATE MATERIAL

[76] Inventors: William C. Gresham, 2809 Fisher Rd., Edmond, Okla. 73013; William H. Gresham, 6009 Parkhurst Rd., Edmond, Okla. 73034

[21] Appl. No.: 675,402

[22] Filed: Mar. 26, 1991

[51] Int. Cl.⁵ .................... A01K 5/02; A01K 39/014
[52] U.S. Cl. ............................... 239/7; 239/70; 239/71; 239/687; 119/51.11; 119/57.91
[58] Field of Search ................. 239/7, 70, 71, 665, 239/681, 684, 687; 119/51.11, 57.91

[56] References Cited

U.S. PATENT DOCUMENTS

| | | | |
|---|---|---|---|
| 3,041,076 | 6/1962 | van der Lely et al. | 239/685 |
| 3,170,264 | 2/1965 | Waldrum | 239/681 |
| 3,698,574 | 10/1972 | Louks | 239/687 |
| 4,986,220 | 1/1991 | Reneau et al. | 119/57.91 |

*Primary Examiner*—Andres Kashnikow
*Assistant Examiner*—Karen B. Merritt
*Attorney, Agent, or Firm*—Lowell W. Gresham; Jordan M. Meschkow; Don J. Flickinger

[57] ABSTRACT

A device and method for automatically dispersing aggregate material, such as animal feed, is disclosed. The device includes a hopper having a spout at a bottom side thereof. A distributor is positioned underneath the spout so that feed or other material within the hopper flows out of the spout and into the distributor. the distributor is dimensioned and positioned relative to the spout so that the feed cones-up and prevents further feed from flowing out of the hopper. The distributor is further configured to have upright walls located around its periphery. The upright walls prevent unintended unloading of the distributor by wind or bumping. The distributor is attached to a shaft of an electrical motor which activates during a rotational cycle in accordance with a schedule established by a control unit. When the motor activates, the distributor rotates, and feed is broadcast from the distributor through openings within the upright walls. As feed is broadcast, additional feed flows from the hopper onto the distributor. The control unit includes the motor, a battery, and low power semiconductor counting circuits for establishing the frequency and duration of rotational cycles. In addition, the control unit includes an indicator, which signals the operational status of the control unit, and a battery extender circuit, which permits the counting circuits to successfully operate even when the battery is running down.

20 Claims, 1 Drawing Sheet

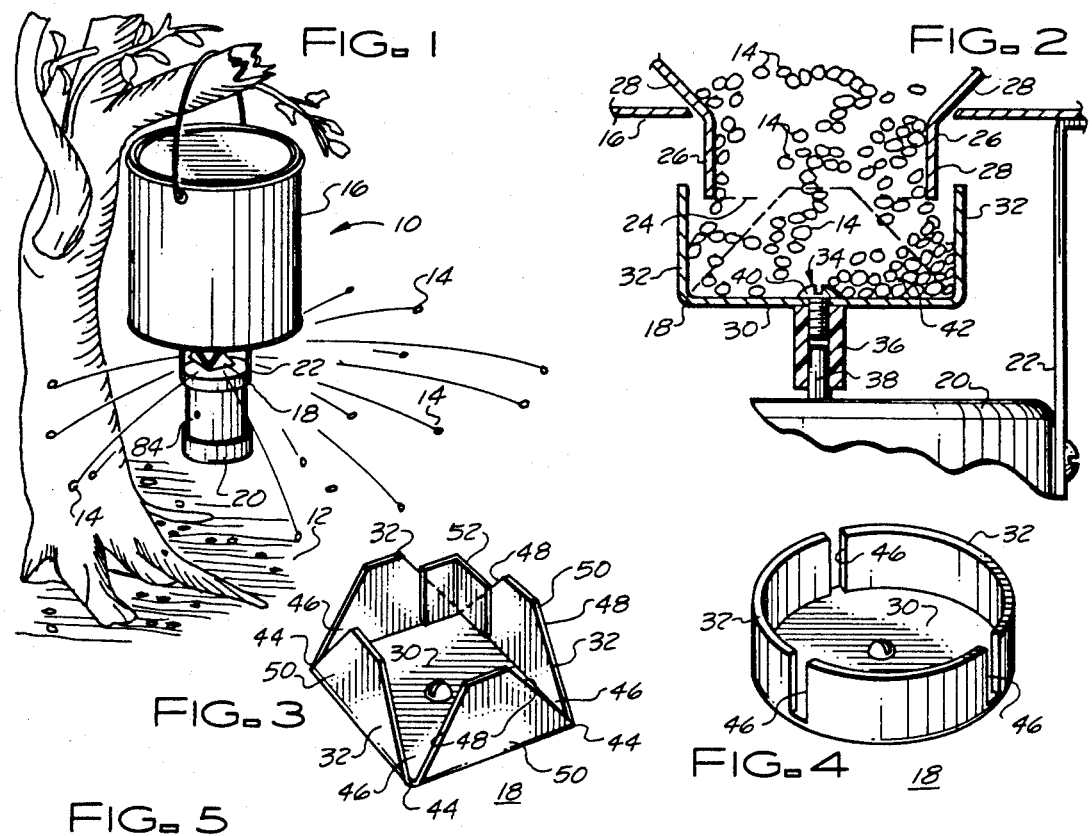

APPARATUS AND METHOD FOR AUTOMATICALLY DISPERSING AGGREGATE MATERIAL

TECHNICAL FIELD OF THE INVENTION

The present invention relates generally to the automatic broadcasting of aggregate material in accordance with a predetermined schedule. More specifically, the present invention relates to automatic feeding devices which periodically disperse aggregate feed material.

BACKGROUND OF THE INVENTION

Sportsmen, conservationists, environmentalists, animal lovers, and others often wish to attract or otherwise care for wild or domestic animals by providing feed for the animals. In many situations, particularly with respect to the of feeding wild animals, the locations most desirable for locating the feed are so remote that a caretaker cannot practically visit them often to bring the feed. In other situations, a caretaker's own schedule may not permit sufficient time for dedicating to animal feeding operations. In these and other situations, the caretaker cannot simply provide an enormous quantity of feed and expect it to last for a long period of time. If an enormous quantity of feed is left at a location where animals can get to it, the feed will soon disappear or become ruined by the weather or by trampling.

Accordingly, animal caretakers often employ automatic feeders located where the feed is to be presented to the animals. The automatic feeders dole out a predetermined quantity of feed on a predetermined schedule. Typically, the schedule is one or two feedings daily. The caretaker may visit the feeder much less frequently, such as weekly or monthly, to refill the feeder and to check for proper operation.

The conventional automatic feeders that are adapted to disperse various types of aggregate materials, such as grains, suffer numerous shortcomings. For example, one type of conventional automatic feeder spaces a hopper, which stores grain, above a distributor, which consists of a horizontal plate having radially extending upright fins. Grain falls from the hopper onto the distributor and "cones-up" so that no additional grain falls from the hopper. By "coning-up", those skilled in the art will understand that the grain forms a mound, or cone, which grows in height until it obstructs an opening in the hopper from which the grain falls. When this happens, no additional grain can fall from the hopper. During a feeding operation, the distributor rotates in accordance with a feeding schedule to broadcast the grain away from the feeder. A battery powered motor causes the rotation. The upright fins cause the grain on the distributor to spin with the distributor, rather than to remain stationary while the distributor rotates underneath the grain.

However, this type of distributor, including its fins, tends to unload grain when the distributor is not rotated in accordance with the feeding schedule. Even relatively light winds may blow grain off the distributor. As the wind blows grain off the distributor, more grain falls from the hopper to replace the grain unloaded by the wind. An entire hopper full of grain may be unloaded and wasted in a very short period of time during windy conditions. In addition, cattle or other crafty animals may learn that they can simply bump this conventional feeder to cause its grain to fall off its distributor. Again, within a short period of time an entire hopper full of grain may be unloaded and wasted.

Furthermore, such conventional automatic feeders typically utilize a relatively large diameter distributor. This large diameter reduces the off-schedule grain unloading somewhat from the off-schedule unloading that would result from using a smaller diameter distributor. However, this large diameter distributor requires the motor to exhibit a correspondingly large torque. Larger torque motors typically consume greater amounts of electrical power, and an automatic feeder's battery life is reduced accordingly. Thus, relatively expensive motors must be included in the automatic feeders and batteries must be replaced or recharged often.

SUMMARY OF THE INVENTION

Accordingly, it is an advantage of the present invention that an improved apparatus and method for automatically dispersing aggregate materials, such as grains, is disclosed.

Another advantage is that the present invention provides an automatic dispersing device having an improved distributor that reduces off-schedule unloading.

Yet another advantage is that the present invention provides an automatic dispersing device which is inexpensive to manufacture and purchase, requires little maintenance, and can operate for several months on a single battery charge.

The above and other advantages of the present invention are carried out in one form by an improved apparatus for automatically dispersing aggregate material on a predetermined schedule and for retarding dispersal of the aggregate material other than on the predetermined schedule. The apparatus includes a hopper, a distributor, and a rotating device. The hopper holds the aggregate material and has an opening somewhere in its lower section. The distributor is located generally below the hopper opening. The distributor has a floor, which receives the aggregate material from the hopper, and upright walls, which are peripherally disposed relative to the floor. The walls have an opening therein. The rotating device couples to the distributor and causes the distributor to rotate in accordance with the predetermined schedule. This rotation causes the distributor to disperse the aggregate material through the opening in the upright walls.

The above and other advantages of the present invention are carried out in another form by a method of automatically dispersing aggregate material on a predetermined schedule while substantially preventing dispersal of the aggregate material other than on the predetermined schedule. The method feeds the aggregate material from a spout onto a generally horizontal distributor floor. The method then confines the aggregate material within upright walls which have an opening. The upright walls are peripherally disposed around the distributor's floor. The method rotates the distributor in accordance with the predetermined schedule. This rotation applies a centrifugal force upon the aggregate material and causes the aggregate material to exit the distributor through the opening in the upright walls.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 1 shows an automatic dispersing device constructed in accordance with the teaching of the present invention;

FIG. 2 shows a cross-sectional side view of a distributor of the present invention and its cooperation with a hopper and a control unit;

FIG. 3 shows a perspective view of a first embodiment of the distributor of the present invention;

FIG. 4 shows a perspective view of a second embodiment of the distributor of the present invention;

FIG. 5 shows a block diagram of the control unit of the present invention; and

FIG. 6 shows a timing chart that describes the operation of the control unit depicted in FIG. 5.

DETAILED DESCRIPTION OF THE PREFERRED EMBODIMENTS

As shown in FIG. 1, an automatic dispersing device 10 is suspended above the ground 12 at a location where dispersal of an aggregate material, such as feed 14, is desired. Generally, device 10 includes a hopper 16, a distributor 18, and a control unit 20. The embodiment illustrated in FIG. 1 uses a 5 gallon bucket for hopper 16; however, larger or smaller hoppers 16 may be easily substituted for the specific hopper 16 illustrated in FIG. 1. In particular, a 15-30 gallon hopper 16 which is suspended above ground 12 on a tripod may advantageously serve particularly long-term or high volume automatic feeding needs. Control unit 20 includes a substantially weatherproof enclosure which houses a battery, control circuits, and a motor (discussed below). Distributor 18 resides below hopper 16 and above control unit 20, coupled to the motor within control unit 20. Control unit 20 rigidly attaches underneath hopper 16 through suitable brackets 22. Accordingly, distributor 18 occupies a stationary position below hopper 16 but may freely rotate at this position in response to rotary forces supplied by control unit 20.

Feed 14 is stored within hopper 16 and is gravity fed out from hopper 16 through a spout (discussed below) onto distributor 18 until feed 14 "cones-up" to stop the further flow of feed 14 out of hopper 16. At times and for durations that control unit 20 establishes, distributor 18 rotates to broadcast feed 14 out from distributor 18. The broadcasting of feed 14 results from centrifugal forces placed on individual grains of feed 14 by the rotation. As distributor 18 broadcasts feed 14, additional feed 14 flows from hopper 16 to distributor 18. Thus, the quantity of feed 14 dispersed by device 10 depends on the duration of a rotational cycle of operation and the frequency of rotational cycles.

FIG. 2 shows a cross-sectional side view of distributor 18 and a bottom portion of hopper 16. In the preferred embodiments of the present invention, hopper 16 has an opening 24 in a lower section thereof. Specifically, hopper 16 includes a spout 26 which extends downward at a bottom side of hopper 16, and opening 24 resides at the bottom end of spout 26. Preferably, spout 26 represents the narrow tube portion of a funnel 28, the larger conical portion of which resides within hopper 16 and extends to the interior vertical walls (not shown) of hopper 16. In the preferred embodiments of the present invention, opening 24 has a circular cross-sectional shape with a diameter greater than 1.25 inches, and optimally around 2.0 inches.

Distributor 18 includes a horizontal floor 30 and vertically upright walls 32. The area occupied by floor 30 exceeds the area of opening 24, and walls 32 are formed around the periphery of floor 30. A hub portion 34 of distributor 18 resides in the central area of floor 30. At hub 34 a mating sleeve 36 attaches to the bottom side of distributor 18. Mating sleeve 36 couples distributor 18 to an electrical motor 38, a shaft of which extends upward from control unit 20. In the preferred embodiments, mating sleeve 36 is formed from a Nylon cylinder which tightly attaches to distributor 18 through the use of a screw 40 threaded into one end of sleeve 36. The shaft of motor 38 press-fits within the other end of sleeve 36.

As discussed above, the coning-up of feed 14 stops the further flow of feed 14 from hopper 16. The dimensions and position of distributor 18 relative to spout 26 and opening 24 affect the coning-up of feed 14 supplied from hopper 16 to distributor 18. Accordingly, feed 14 flows out from spout 26 until a mound 42 of feed 14 resides within distributor 18. The sides of mound 42 form an angle with floor 30. The precise value of this angle depends on the structural nature of the aggregate materials from which it is formed. For example, milo, which is relatively spherical in shape, supports only a relatively small angle while oats or corn, which are somewhat rectangular in shape, support a much larger angle. These angles are accommodated by positioning floor 30 a desirable vertical height beneath opening 24 of spout 26 and by positioning walls 32, or at least openings (discussed below) in walls 32, a desirable distance horizontally away from the interior surface of spout 26. In the preferred embodiment, the ratio of this height to distance is in the range of 0.5 to 1.5 to accommodate a wide variety of grains.

If the area of floor 30 is too small, then feed 14 will not cone-up at all, and the flow of feed 14 from hopper 16 will not stop until the entire contents of hopper 16 have been emptied. On the other hand, the larger the area of floor 30, the larger the torque requirements of motor 40. In the preferred embodiments of the present invention, floor 30 exhibits an area of around 4.0-10.0 in.$^2$, and most preferably around 6.25 in$^2$.

Similarly, if floor 30 resides too far beneath opening 24, then feed 14 will not cone-up. But, if floor 30 is positioned too near opening 24, then aggregate materials which are not spherical, such as corn and oats, may not flow properly and the broadcasting of feed 14 from distributor 18 may be defeated. In the preferred embodiments of the present invention, the lower of floor 30 or the lower portion of the openings in walls 32 are positioned a distance of around 0.5-1.5 in. beneath opening 24, and most preferably around 1.0 in.

Moreover, walls 32 extend upward above opening 24 in the preferred embodiments of the present invention. Preferably, walls 32 extend at least 0.125 in. above opening 24 and more preferably around 0.25 in. The extension of walls 32 above opening 24 in spout 26 enhances the ability of distributor 18 to resist off-schedule unloading. The greater the distance walls 32 extend above opening 24 in spout 26, the less chance exists for larger pelletized aggregate materials, such as corn, to become jammed and block the rotation of distributor 18.

FIGS. 3 and 4 show perspective views of preferred embodiments of distributor 18. In the FIG. 3 embodiment, floor 30 has a square shape which is preferably around 2.5 in. along a side. Walls 32 extend upward along the sides of this square, but not near corners 44 of the square. Thus, openings 46 in walls 32 at corners 44 of the FIG. 3 distributor 18 extend the entire vertical height of walls 32, and the FIG. 3 distributor 18 has four openings 46. Feed 14 (see FIG. 1) is broadcast out from distributor 18 at openings 46 during a rotational cycle.

Moreover, walls 32 have tapered edges 48 so that each side 50 of walls 32 resembles a trapezoid having a larger edge adjacent floor 30 and a smaller edge at the top of distributor 18. It is the distance to corners 44 of the FIG. 3 distributor 18 that is important in accommodating an angle which will support the coning-up of feed 14 (see FIG. 2). If the horizontal distance to corners 44 from spout 26 (see FIG. 2) is too small, then feed 14 will continually run out openings 46 and not cone-up. In the preferred embodiments of the present invention, the horizontal distance between each opening 46 and a closest portion of spout 26 is between 0.3 and 3.0 inches, and most preferably between 0.5 and 2.0 inches. The distance between spout 26 and walls 32 is less critical because walls 32 will block the horizontal spreading of feed 14. As shown in FIG. 2, feed 14 may ride partially up walls 32 before it cones-up.

FIG. 3 additionally shows a shield 52 that may optionally be positioned over one of openings 46. Shields 52 reduce the quantity of feed 14 dispersed by device 10 during any single rotational cycle. Shields 52 may be constructed from any suitable material which will block the broadcasting of feed 14 during a rotational cycle and which will withstand the weather. Shields 52 are attached in place using any suitable fastening technique, such as adhesives or screws. Shields 52 may be selectively positioned over one or more (or less) of openings 46 so that device 10 broadcasts a desirable quantity of feed 14 during each rotational cycle.

The present invention may accommodate a wide variation in shape for distributors 18. The FIG. 4 embodiment, for example, has a circular floor 30 and only three openings 46. Other features of the FIG. 4 embodiment remain substantially as described above.

FIG. 5 shows a block diagram of electrical circuits included within control unit 20 to establish the frequency and duration of rotational cycles. In particular, control unit 20 includes a battery 54, which in the preferred embodiment is a conventional 6 Vdc lantern battery. A positive terminal of battery 54 couples to a V+ node 56, and a negative terminal of battery 54 couples to a ground node 58. A battery extender circuit 60 couples between V+ node 56 and a $VV_E^+$ node 62. Specifically, battery extender circuit 60 includes a diode 64 having an anode coupled to V+ node 56 and a cathode coupled to $V_E^+$ node 62. A capacitor 66 couples between $V_E^+$ node 62 and ground node 58. Electrical power from $V_E^+$ node 62 energizes a counter 68, a logic circuit 70, and an operational status indicator 72.

Counter 68 counts pulses generated by a crystal oscillator 74 and provides count output data to a data input of logic circuit 70. In the preferred embodiments, logic circuit 70 is configured to output a status signal derived from the count output data. This status signal exhibits around an eight second period.

Operational status indicator 72 includes a high pass filter, consisting of a capacitor 76 coupled in series with a resistor 78. This high pass filter couples to the eight second status output from logic circuit 70. Indicator 72 additionally includes a bias resistor 80, a first node of which couples to $V_E^+$ node 62 and a second node of which couples to both resistor 78 and a base of an NPN transistor 82. An emitter of transistor 82 couples to ground node 58. A series coupled light emitting diode (LED) 84 and current limiting resistor 86 couple between $V_E^+$ node 62 and a collector of transistor 82.

As shown in FIG. 1, LED 84 physically resides on the exterior of control unit 20. Trace "A" of FIG. 6 illustrates the operation of LED 84. As illustrated in trace "A" of FIG. 6, LED 84 flashes for approximately 0.1 second once every approximately 8 seconds to provide an indication that control unit 20 is properly operating. Moreover, this indication occurs whether or not control unit 20 indicates a rotational cycle. With reference to the circuits shown in FIG. 5, capacitor 76 and resistor 78 are mutually configured so that when a positive transition of the eight second status signal from logic circuit 70 occurs, a pulse of around 0.1 second appears at the base of transistor 82. This 0.1 second pulse switches transistor 82 "on" and illuminates LED 84 for the approximate 0.1 second period.

Logic circuit 70 additionally provides a terminal count output that establishes the frequency and duration of the rotational cycle for distributor 18 (see FIGS. 1-4). Trace "B" of FIG. 6 shows that the preferred embodiments of the present invention use a rotational cycle having approximately four seconds of "on" time interspersed with approximately 24 hours of standby or "off" time. Logic circuit 70 generates this timing using conventional logic circuits and the data supplied by counter 68. This terminal count output couples to a base of an NPN transistor 88 through a current limiting resistor 90. An emitter of transistor 88 couples to ground node 58. Motor 38 couples between V+ node 56 and a collector of transistor 88. Likewise, a capacitor 92 couples between V+ node 56 and the collector of transistor 88, and a cathode of a diode 94 couples to V+ node 56 while an anode of diode 94 couples to the collector of transistor 88. Capacitor 92 and diode 94 protect transistor 88 from voltage spikes which may otherwise result from switching motor 38 "off" and "on". Thus, the terminal count output signal activates transistor 88, which in turn activates motor 38. As discussed above, the activation of motor 38 causes distributor 18 to rotate and disperse feed 14 (see FIG. 1).

Counter 68 has a reset input which is controlled to reset the count indicated thereby to an initial condition. Logic circuit 70 resets counter 68 through a diode 96. Logic circuit 70 uses conventional logic elements to generate a reset signal after the completion of the terminal count signal. In addition, a power-on reset circuit 98 generates a reset signal when power is initially applied to the circuits shown in FIG. 5 from battery 54. Specifically, a first node of a resistor 100 couples to $V_E^+$ node 62 and a second node of resistor 100 couples to a first node of a capacitor 102. A second node of capacitor 102 couples to the reset input of counter 68 and to a first node of a resistor 104. A second node of resistor 104 couples to ground node 58. Power-on reset circuit 98 causes the first rotational cycle of device 10 to occur approximately 24 hours after a battery is first installed within control unit 20, rather than at some random time.

In the preferred embodiments of the present invention, the active circuits which are utilized within counter 68 and logic circuits 70 are low-power CMOS parts. Thus, they consume a very small portion of the power supplied by battery 54. In the preferred embodiments of the present invention, motor 38 is a relatively low torque motor which is less expensive and consumes less power than an otherwise equivalent higher torque motor. In addition, motor 38 preferably operates on voltages as low as 3 Vdc. Thus, motor 38 can continue to operate even when battery 54 is nearly used up.

Battery extender circuit 60 permits the power supplied to counter 68 and logic circuits 70 to remain relatively stable, even when motor 38 may reduce the voltage of battery 54 to as low as 3 Vdc or lower. Specifically, when battery 54 is running down and before motor 38 activates, the current requirements imposed on battery 54 are so low that it can easily supply this current requirement at around 6 Vdc. Thus, capacitor 66 charges to a voltage in excess of 5 Vdc. In the preferred embodiments of the present invention, the value chosen for capacitor 66 is sufficiently large, such as around 4700 microfarads, that it easily stores enough energy to entirely accommodate the power supply needs of counter 68, logic circuits 70, and operational status indicator 72 during a rotational cycle. Accordingly, as battery 54 begins to run down, motor 38 may reduce the voltage of battery 54 during a rotational cycle. However, this reduction in battery voltage has no effect on the operation of other circuits within control unit 20 because such other circuits are energized by capacitor 66 throughout the duration of a rotational cycle. Diode 64 isolates such circuits from battery 54 and motor 38. After a rotational cycle ends, motor 38 turns "off", and battery 54 no longer needs to supply the current needs of motor 38. Consequently, the voltage of battery 54 increases sufficiently to cause capacitor 66 to recharge. Due, at least in part, to the operation of battery extender circuit 60, the preferred embodiments of the present invention can usually operate for around 6 months on a single battery 54.

In summary, the present invention provides an improved apparatus and method for automatically dispersing aggregate materials, such as feed 14. In particular, the present invention has an improved distributor that reduces off-schedule unloading due to its peripheral walls. Moreover, the present invention requires little maintenance. The low maintenance requirement results from its ability to resist off-schedule unloading and its ability to use very little electrical power. The low power requirements result from the use of a low torque motor, which the present invention's improved distributor accommodates, low power semiconductor timing circuits, and a battery extender circuit which permits continued successful operation of the timing circuits even when battery 54 is running down.

The present invention has been described above with reference to preferred embodiments. However, those skilled in the art will recognize that changes and modifications may be made in these preferred embodiments without departing from the scope of the present invention. For example, the present invention is not limited to being used to distribute feed. In addition, those skilled in the art will recognize that the terms vertical, horizontal, bottom, and top as used herein are relative and not absolute terms. Moreover, the time periods associated with rotational cycles and with indicating operational status are largely arbitrary and may be easily adjusted by those skilled in the art to meet the varying needs of different specific applications. These and other changes and modifications which are obvious to those skilled in the art are intended to be included within the scope of the present invention.

What is claimed is:

1. An apparatus for automatically dispersing aggregate material on a predetermined schedule and for retarding dispersal of said aggregate material other than on said predetermined schedule, said apparatus comprising:
    a hopper for holding said aggregate material, said hopper having an opening in a lower section thereof;
    a distributor residing generally below said hopper opening, said distributor having a floor for receiving said aggregate material from said hopper and said distributor having upright walls peripherally disposed relative to said floor, said upright walls having an unobstructed opening therein; and
    means, coupled to said distributor, for rotating said distributor in accordance with said schedule, said rotation causing said distributor to disperse said aggregate material through said opening in said upright walls.

2. An apparatus as claimed in claim 1 wherein:
    said distributor floor exhibits a first area and said hopper opening exhibits a second area; and
    said first area is greater than said second area.

3. An apparatus as claimed in claim 2 wherein said hopper opening exhibits a diameter in excess of approximately 1.25 inches.

4. An apparatus as claimed in claim 1 wherein said hopper has a downward extending spout, and said hopper opening is located at a bottom end of said spout.

5. An apparatus as claimed in claim 4 wherein said upright walls of said distributor extend above said bottom end of said spout.

6. An apparatus as claimed in claim 5 wherein said upright walls of said distributor extend at least ⅛ of an inch above said bottom end of said spout.

7. An apparatus as claimed in claim 1 wherein said opening in said upright walls is positioned proximate said floor.

8. An apparatus as claimed in claim 1 wherein a plurality of openings are distributed around said upright walls.

9. An apparatus as claimed in claim 8 additionally comprising a shield positioned on said upright walls to block dispersal of said aggregate material through one of said plurality of openings so that the quantity of said aggregate material dispersed by said distributor is less than the quantity of said aggregate material dispersable by said distributor without said shield.

10. An apparatus as claimed in claim 1 wherein:
    said hopper opening is surrounded by a hopper opening wall;
    said distributor has a hub about which said rotating means causes said distributor to rotate; and
    said distributor is positioned so that said hub is centrally located underneath said hopper opening wall.

11. An apparatus as claimed in claim 10 wherein said opening in said upright walls is positioned so that a lower portion of said opening resides a distance H below said hopper opening and a distance D away from a closest point on said hopper opening wall, said distances H and D being substantially perpendicular to each other and extending so that the ratio of H/D is in the range of 0.5 to 1.5.

12. An apparatus as claimed in claim 11 wherein said distributor is positioned relative to said hopper so that said distance H is in the range of 0.5 to 1.5 inches.

13. An apparatus as claimed in claim 1 wherein said rotating means comprises:
    a motor coupled to said distributor to selectively cause said distributor to rotate;

timing means, coupled to said motor, for determining a dispersal duration, during which said motor causes said distributor to rotate, and for determining a standby duration, during which said motor refrains from causing said distributor to rotate; and means, coupled to said timing means, for indicating operational status of said timing means during said standby duration.

14. An apparatus as claimed in claim 1 wherein said rotating means comprises:
   a battery for supplying electrical energy;
   a motor coupled to said battery;
   a timing circuit coupled to said motor, said timing circuit having an electrical power requirement, and said timing circuit operating to determine a dispersal duration, during which said motor causes said distributor to rotate, and to determine a standby duration, during which said motor refrains from causing said distributor to rotate; and
   means, coupled to said battery and to said timing circuit, for storing a sufficient quantity of electrical energy to meet said electrical power requirement of said timing circuit throughout said dispersal duration.

15. An apparatus as claimed in claim 14 wherein said rotating means additionally comprises isolation means, coupled between said battery and said energy storage means, said isolation means being for preventing said energy storage means from supplying electrical energy to said motor during said dispersal duration.

16. A method of automatically dispersing aggregate material on a predetermined schedule while substantially preventing dispersal of said aggregate material other than on said predetermined schedule, said method comprising the steps of:
   feeding said aggregate material onto a generally horizontal distributor floor from a spout;
   confining said aggregate material within upright walls having an unobstructed opening therein and being peripherally disposed on said distributor relative to said floor; and
   rotating said distributor in accordance with said predetermined schedule, said rotation applying a centrifugal force upon said aggregate material to cause said aggregate material to exit said distributor through said opening in said upright walls.

17. A method as claimed in claim 16 wherein said distributor floor is disposed below a bottom end of said spout, and said method additionally comprises the step of extending said upright walls above said bottom end of said spout.

18. A method as claimed in claim 16 wherein said upright walls have a plurality of openings therein, and said method additionally comprises the step of shielding one of said openings to block dispersal of said aggregate material through said one of said plurality of openings so that the quantity of said aggregate material dispersed by said distributor is reduced from the quantity of said aggregate material dispensable by said distributor without said shielding.

19. An apparatus for automatically dispersing aggregate material on a predetermined schedule and for retarding dispersal of said aggregate material other than on said predetermined schedule, said apparatus comprising:
   a hopper for holding said aggregate material, said hopper having a spout extending downward therefrom and terminating at a bottom end;
   a distributor having a floor and upwardly extending walls peripherally located relative to said floor, said walls having a plurality of openings therein positioned proximate said floor, and said distributor being positioned so that said floor is centrally located beneath said bottom end of said spout and said walls extend above said bottom end of said spout;
   a motor positioned beneath said distributor and coupled to a central section of said distributor floor;
   a battery for supplying electrical energy to said motor, said battery being coupled to said motor;
   a timing circuit coupled to said motor, said timing circuit having an electrical power requirement, and said timing circuit operating to determine a dispersal duration during which said motor causes said distributor to rotate and during which said aggregate material is dispersed through said plurality of openings in said distributor walls; and
   means, coupled to said battery and to said timing circuit, for storing a sufficient quantity of electrical energy to supply said electrical power requirement of said timing circuit throughout said dispersal duration.

20. An apparatus as claimed in claim 19 wherein: said openings in said upright walls are positioned so that, on average, a lower portion of said openings reside a vertical distance in the range of 0.5 to 1.5 inches below said bottom end of said spout; and
   said openings are further positioned so that, on average, said lower portion of said openings reside a horizontal distance in the range of 0.5 to 2.0 inches away from a closest portion of said spout.

* * * * *